United States Patent [19]

Halford et al.

[11] Patent Number: 5,021,030

[45] Date of Patent: Jun. 4, 1991

[54] STRAW SPREADER FOR A COMBINE HARVESTER AND METHOD OF SPREADING

[75] Inventors: James Halford, Box 417, Indian Head, Saskatchewan, Canada, S0G 2K0; William B. Reed, Saskatoon, Canada

[73] Assignee: James Halford, Indian Head, Canada

[21] Appl. No.: 487,261

[22] Filed: Mar. 2, 1990

[51] Int. Cl.[5] .............................................. A01F 29/12
[52] U.S. Cl. ..................................... 460/111; 239/673; 239/682; 460/112
[58] Field of Search .......... 56/16.8, 370, 474, DIG. 5, 56/13.3, 71; 239/650, 651, 654, 655, 661, 668, 672, 673, 682, 687; 460/111, 112

[56] References Cited

U.S. PATENT DOCUMENTS

| | | | |
|---|---|---|---|
| 1,462,387 | 7/1923 | Slade | 239/682 |
| 1,940,008 | 12/1933 | Mosgrove | 239/673 |
| 2,886,334 | 5/1959 | Presler | 239/661 |
| 3,412,943 | 11/1968 | Lewis et al. | 239/651 |
| 3,414,200 | 12/1968 | Savory | 239/673 |
| 4,350,303 | 9/1982 | van der Lely | 239/673 |
| 4,526,180 | 7/1985 | Scott et al. | 130/27 R |
| 4,591,102 | 5/1986 | Clarke | 239/655 |
| 4,917,652 | 4/1990 | Glaubitz et al. | 460/111 |

Primary Examiner—Ramon S. Britts
Assistant Examiner—David J. Bagnell
Attorney, Agent, or Firm—Adrian D. Battison; Stanley G. Ade; Murray E. Thrift

[57] ABSTRACT

A straw spreader for the rear straw discharge of a combine comprises a frame mounted on ground wheels together with a pair of hitch arms which extend forwardly from the frame on either side of the rear portion of the combine for attachment to the combine frame structure. The separate frame can thus move up and down relative to the rear of the combine and maintains a pair of spreader spinners on the frame at a predetermined height relative to the ground. Guide surfaces collect the material from the chopper at the rear of the combine and direct it onto the spinners for a spreading action. The low height of the spreading action reduces dust emission and enhances spreading consistency. An accumulator can be provided between the spreader and the discharge in the rear of the combine to allow the amount of straw spread to be varied relative to the amount collected at any particular point on the field.

17 Claims, 4 Drawing Sheets

STRAW SPREADER FOR A COMBINE HARVESTER AND METHOD OF SPREADING

BACKGROUND OF THE INVENTION

This invention relates to a straw spreader for spreading straw discharged from a combine harvester.

For zero till and low till farming practices, it is fundamentally more important to ensure that straw discharged from the rear discharge opening of a combine is spread effectively over the ground. This spreading action prevents the collection of trash at specific locations on the ground which would interfere with seeding in the subsequent harvesting year. In addition the effective spreading of the straw across the ground can assist in retaining moisture over most of the ground rather than in specific areas where the straw lands if not properly spread. Furthermore the nutrients from the straw are applied equally across the ground.

Conventionally the combine harvester includes a chopper at a rear discharge opening of the combine so the straw emerging from the rear of the straw walkers is vigorously chopped into short lengths and discharged rearwardly and downwardly from the rear opening of the combine. This action merely dumps the straw onto the ground in a stream behind the combine with little or no spreading action to the sides. Other devices have been proposed for addition onto the combine to provide a chopping and spreading action. One problem which arises with devices of this type is that they are mounted relatively high on the combine and this causes the spreading action to be adversely affected by wind movement. This wind effect on the straw can alter the desired even spread so the material is spread in bands across the ground. Furthermore, the relatively high discharge causes the wide spread of large amounts of dust which can interfere with the driver's operation of the combine.

SUMMARY OF THE INVENTION

It is one object of the present invention, therefore, to provide an improved straw spreader for attachment to a combine which allows a more effective and even spreading action.

It is a further object of the present invention to provide a spreader for attachment to a combine which reduces the amount of dust discharged around the combine.

As yet further object of the present invention to provide a straw spreader which can be readily attached and removed from the combine.

As a yet further object of the present invention to provide a straw spreader which can be used to vary the amount of straw spread on the ground relative to the amount of straw taken from that portion of the ground.

According to a first aspect of the invention there is provided a straw spreader for a combine harvester comprising a frame, at least one ground wheel on the frame for engaging the ground and supporting the frame at a predetermined height relative to the ground, hitch means for coupling the frame to a rear part of the combine for transportation behind the combine, spreader means mounted on the frame for discharging straw in a spread pattern outwardly to at least one side of the frame and guide means for receiving straw from a discharge opening of the combine and transporting the straw to the spreader means.

According to a second aspect of the invention there is provided a straw spreader for a combine harvester comprising a frame, at least one ground wheel on the frame for engaging the ground and supporting the frame at a predetermined height relative to the ground, hitch means for coupling the frame to a rear part of the combine for transportation behind the combine, spreader means mounted on the frame for discharging straw in a spread pattern outwardly to at least one side of the frame guide means for receiving straw from a discharge opening of the combine and transporting the straw to the spreader means, storage means for storing and accumulating chopped straw from the discharge opening of the combine and means for transporting the straw from the storage means to the spreader means such that the amount of straw spread on a portion of the ground can be varied relative to the amount of straw collected from that portion of ground.

The low position of the spreader relative to the ground reduces the effect of the wind on the spreading action which means:

(a) the dust is maintained closer to the ground and is less problem;

(b) the spread pattern is less affected by wind action and is more consistent.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
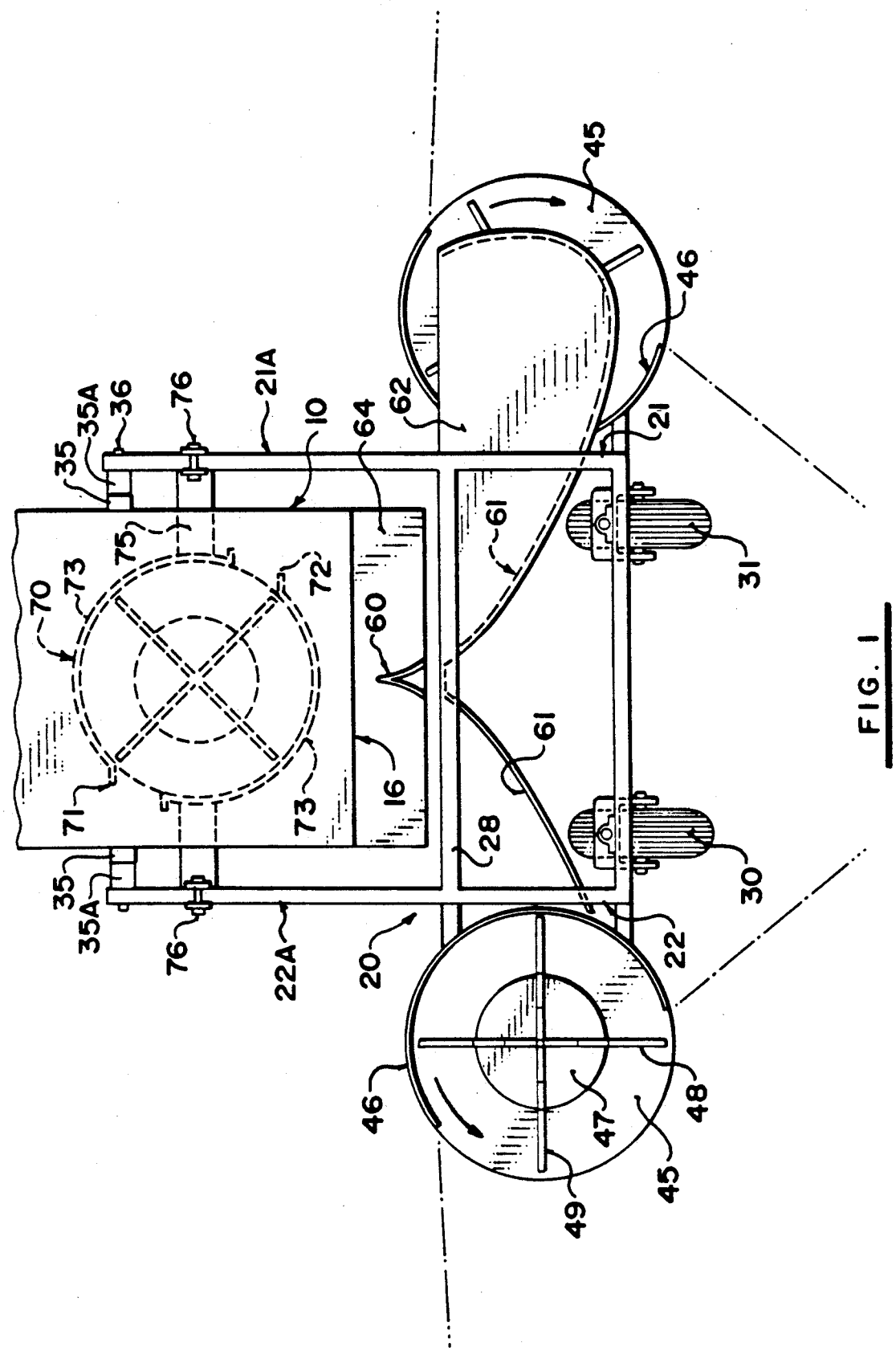
FIG. 1 is a top plan view of a rear portion of a combine harvester to which is attached a straw spreader according to the present invention.
Figure 2:
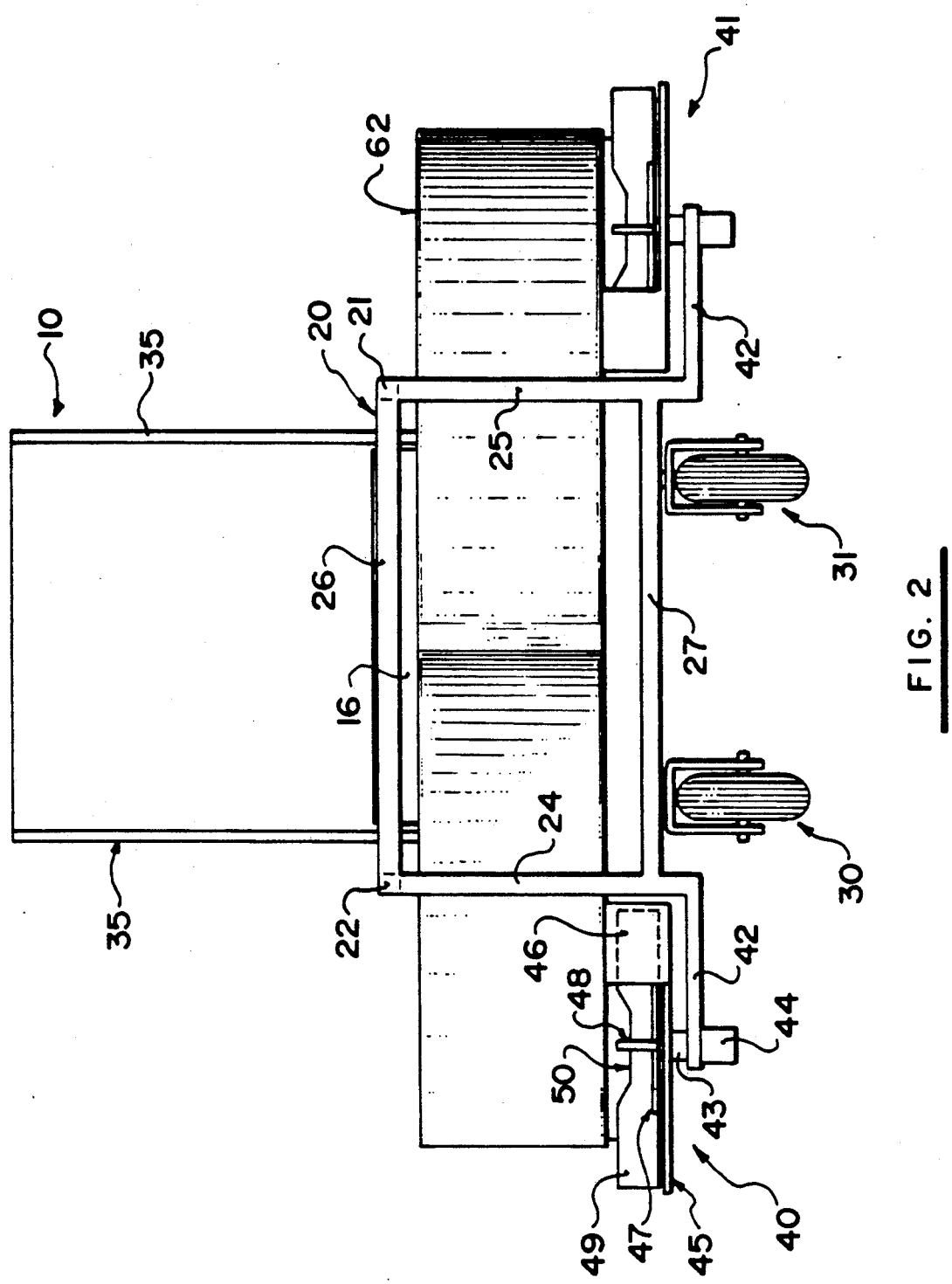
FIG. 2 is a rear elevation of the straw spreader and combine of FIG. 1.
Figure 3:
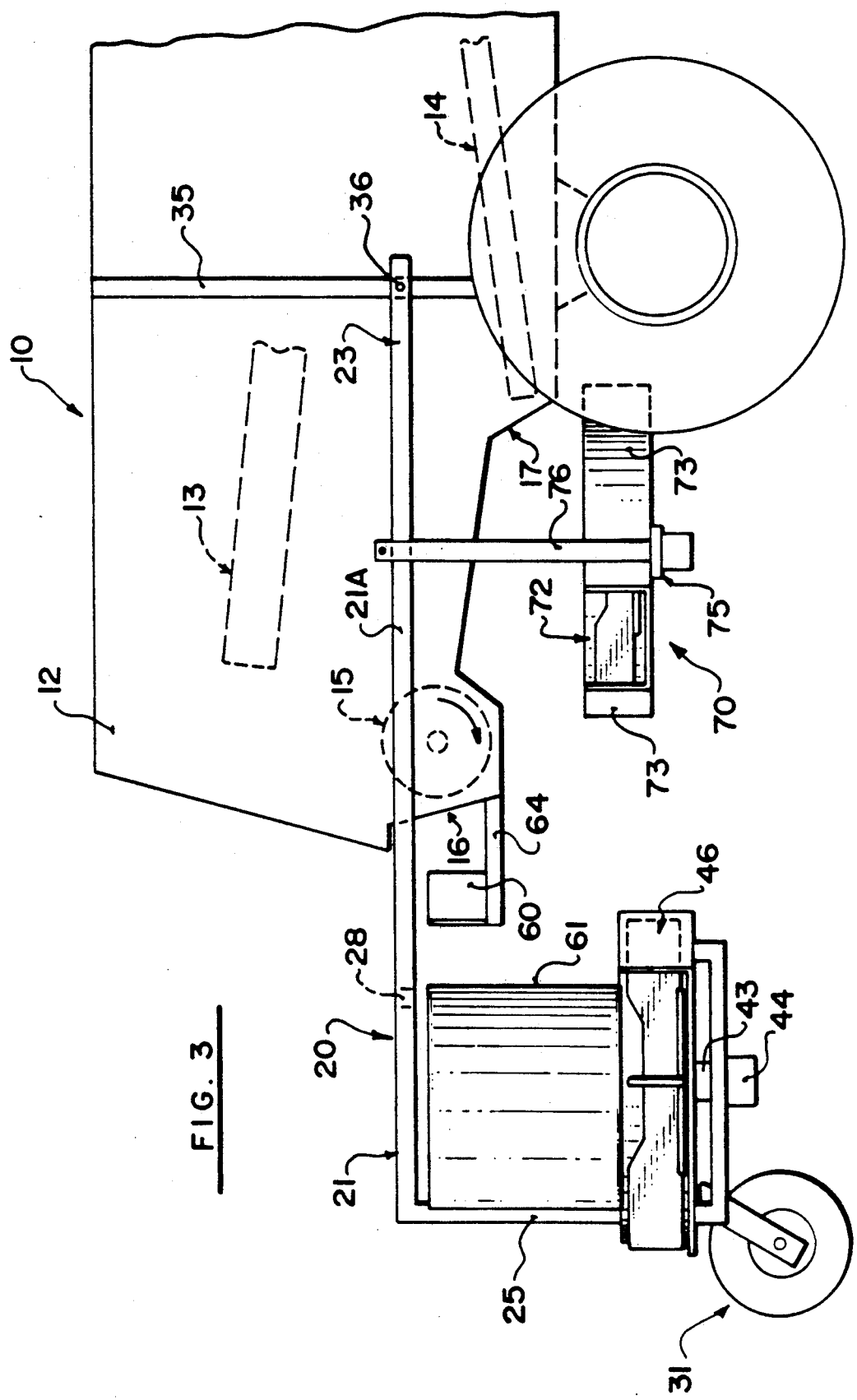
FIG. 3 is a side elevation of the straw spreader and rear of the combine of FIG. 1.
Figure 4:
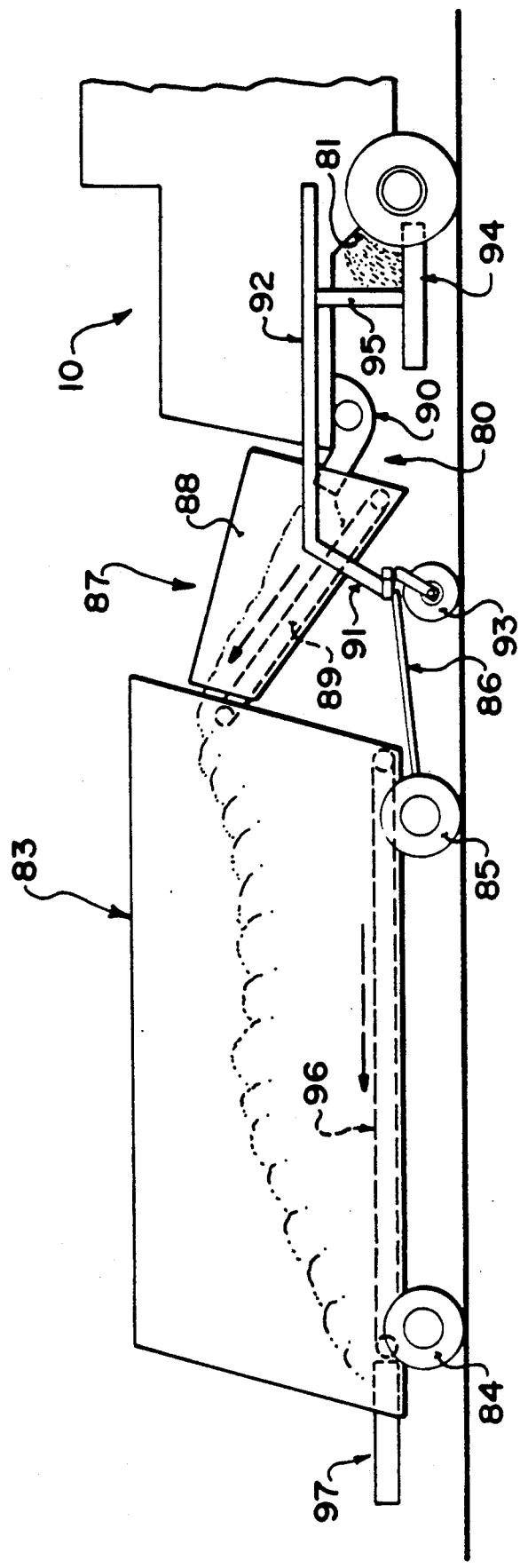
FIG. 4 is a schematic side elevational view of an alternative straw spreader including an accumulator.

The rear portion of a conventional combine is indicated generally at 10 mounted on the ground wheels 11 for transportation of the combine across the ground in a crop harvesting action. The details of the combine will not be described herein as they are conventional and vary from machine to machine but generally the machine includes a rear housing 12 which covers the straw walkers 13 together with a chaffer sieve 14. The machines shown is of the self-propelled type but also the invention can be used with a pull-type in which the wheels are moved forwardly. From the rear end of the straw walker the separated straw discharges onto a chopper 15 which rotates around a horizontal axis and extends across the width of the rear part of the housing so that all of the straw falling from the straw walker is chopped into short lengths and discharged outwardly through a discharge opening 16 across the lower edge of the rear face of the combine housing 12. The separated chaff from the sieve 14 is discharged from an area beneath the housing 12 through an opening indicated at 17 at a position generally between the rear wheels 11 of the combine.

Without the addition of any spreader arrangement, the straw would be deposited on the ground generally rearwardly of the combine over a width not significantly greater than that of the rear end of the combine and the chaff also would merely fall onto the ground over the same area.

The present invention therefore provides a straw spreader arrangement which may also incorporate a chaff spreader arrangement for receiving the straw discharged rearwardly from the combine and for spreading the straw over a greater width than the combine to obtain, as far as possible, an even spread across the ground.

The spreader comprises a metal frame 20 in the form of a rectangular structure defined by plurality of coupled beams. Specifically the frame includes a pair of side arms 21 and 22 which form two top side rails of the frame and continue forwardly from the frame to form a hitch section 23 defined by the forward portions of the arms indicated at 21A and 22A respectively.

In addition the frame includes vertical rear struts 24 and 25 and horizontal rear frame elements 26 and 27 at a top and bottom respectively of the frame. Forward cross frame elements 28 are provided at the front of the frame at the top and bottom respectively with the top frame element only being visible in the drawings. The frame further includes horizontal side frame elements at the bottom of the frame parallel to the arms 21 and 22 but again these are not visible in the drawings. The frame may be braced by various diagonal bracing elements to form a box structure.

A pair of castor wheels 30 and 31 are provided for supporting the frame and these are mounted for castoring action on the cross frame element 27 at the bottom of the frame.

The rear part of the combine 10 includes a vertical frame element 35 which is rigidly attached to the combine and forms a structural member thereof. This vertical frame element is positioned adjacent the ground wheels approximately five or six feet forwardly from the discharge opening 16 and the arms 21A and 22A extend from the frame forwardly for connection by inwardly extending coupling elements 35A to the vertical frame element 35. A pivot pin 36 allows the arms to move upwardly and downwardly as the height of the frame varies relative to the rear end of the combine as the device moves over rougher terrain while preventing the device from twisting or moving side to side relative to the combine. The height of the frame is governed by the ground wheels 30 and 31 so that the height of the device is substantially independent of the height of the rear part of the combine which can thus twist as the combine goes over the ridge or through a valley.

The frame carries a pair of spreader elements 40 and 41 which together provide a spreading action on the straw discharging from the rear of the combine. Each of the spreader elements is mounted upon a frame structure 42 extending outwardly from one side of the frame. The frame structure 42 supports a horizontal circular plate 45 which is fixed relative to the frame structure and thus is held against rotation. Around one part of the periphery of the circular plate 45 is mounted an upstanding guide wall 46. As shown in FIG. 1 the guide wall 46 extends from approximately the 11:00 position to approximately the 5:00 position of the left hand spreader assembly so that straw is prevented from escaping from the top of the plate 45 around the area where the guide wall is provided but is free to escape outwardly to the sides and rearwardly over the area where the guidewall is omitted over a spread pattern shown in dotted line which includes the sides and the rear of the device.

A smaller plate 47 is mounted on top of the plate 45 and is rotatable relative thereto mounted upon a shaft (not shown) carried in bearings 43 and driven for rotation about a vertical axis by a hydraulic motor 44. The smaller circular plate 47 carries the pairs of fins 48 and 49 which extend diametrically of the plate 45 and standing upwardly therefrom in so that the fins cross at the axis of rotation of the plate 47. The fins thus comprise substantially a simple vertical wall but a centre portion of the vertical wall is reduced in height as indicated at 50. The reduced height position acts to draw the material into the center of the spinner. The blades can be canted forwardly out of the vertical plane to prevent material escaping upwardly from the blades so that the material leaves the blades generally at right angles to the blade over the spread pattern shown.

In addition the frame carries a guide system for directing the straw discharging from the opening 16 onto the spreader assemblies. The guide system is shown on the right hand side of FIG. 1 and includes an apex portion 60 which includes a vertical line centrally of the discharge opening 16 and arranged to divide the straw driven outwardly from the opening 16 into two halves. The apex portion discharges and has diverging walls 61 extending rearwardly and outwardly with a forwardly facing portion for receiving the rearwardly discharged straw to turn it outwardly toward the spreader assembly. The curved guide wall 61 carries a top plate or upper surface 62 which faces downwardly and controls the flow of the straw and the air stream from the chopper of the combine so that it moves outwardly and then downwardly onto the top of the spreader assembly particularly at the central area defined by the portion of reduced height of the fins. The curved wall 61 is open at the bottom across the full area of the bottom with the momentum of the straw and the flow of the air stream causing the straw to pass from the apex 60 around the wall 61 to drop onto the spreader. The control of the straw into the spreader is caused by the slowing action of the increased curvature of the wall 61 and by the downward air stream generated into the centre of the spreader. The spreader then directs the air outwardly in a horizontal direction over the area which is free from the guide wall 46. A plate 64 is mounted at the discharge opening 16 of the combine and extends outwardly therefrom in the substantially horizontal plane across the full width of the opening 16. This plate acts to direct the material into the guide portion on the frame so that it is injected into the guide portion at a sufficient height to swirl around and to drop onto the spreader plates. The apex portion 60 is mounted on the plate 64 and is fixed thereto. The walls 61 can move relative to the apex portion as the rear of the combine lifts and lowers relative to the spreader device.

The straw spreader described above has the advantages that the spreader plates are mounted as close to the ground as possible that is at a height of approximately nine to fifteen inches from the ground and this position has two effects. Firstly, it reduces the amount of dust which is directed upwardly from the spreader action to avoid the combine becoming enveloped in the grain dust which is detrimental and can cause difficulty in operation. Secondly, the spreading actions takes place at a height which is much closer to the ground than conventionally and this is beneath the majority of the effect of the wind blowing across the ground so that the spreading action is much less dependent upon any cross winds which could otherwise interfere with the spread pattern.

The mounting of the spreader as a separate assembly on the rear of the combine carried by its own ground wheels and pivotal relative to the combine ensures that the spreader cannot be grounded by the combine passing over rough terrain. In addition the spreader is maintained at a proper height for the spreading action and the spreading action is thus much more consistent obtaining a more consistent spreading effect.

The system uses energy from the conventional chopper of the combine and the air flow from that chopper to move the material to the spreader. The shielding is designed to control ths air flow to obtain the required movement. The system provides a delay or dwell in the discharge of the straw sufficient to move the material from the position at which it is cut so that some averaging between heavy and light crop areas can be obtained.

A chaff spreader 70 is mounted under the chaffer sieve 14 so as to receive the chaff exiting therefrom and to spread it outwardly to the sides in a spreading action generated by rotating fins substantially of the type previously described. Two nozzles 71 and 72 are formed by the configuration of a surrounding wall 73 so the material is caused to spread outwardly preferentially to the sides of the combine. The chaffer 70 is mounted upon a cross beam 75 carried upon a pair of vertical straps 76 attached to the arms 21A and 22A respectively.

The chaff spreader and the straw spreader are therefore provided as a single unit which can be readily attached and detached from the rear of the combine as required.

The device of movement of the spinners of the chaff spreader and straw spreader are cumulative to improve the air flow outwardly from the sides of the combine. The chaff spreader is shielded on all sides by the combine itself and by the device.

Turning now to FIG. 4 the rear of a combine is again indicated at 10 and includes a straw discharge area 80 and a chaff discharge area 81 as previously described. In this case the spreader includes an accumulator in the form of a trailer vehicle 83 mounted upon rear wheels 84 and front wheels 85 and drawn by a hitch 86. The front wheels are steerable by the hitch in a wagon steering action so the trailer properly follows the combine.

A transfer assembly 87 is provided which includes a housing 88 defined by side walls and a base wall with the base wall being inclined upwardly and rearwardly. Just above the base wall is provided a conveyor assembly 89 including suitable drive mechanism and either an endless belt or chains and cross slats as required.

A guide chute 90 directs the material from the chopper at the discharge 80 onto the conveyor 89 so as to carry the material upwardly into the trailer 83.

The guide duct 88 is carried on a frame 91 which includes two arms 92 which project forwardly therefrom for coupling to the combine in the same manner as the arms 21A and 22A previously described. In this case the rear part of the frame is carried upon a single castor wheel 93 which supports a forward end of the hitch 86. The chaff spreader assembly 94 is substantially the same as previously described and is carried upon straps 95 as previously described.

Inside the trailer is provided a conveyor arrangement 96 which transports the straw material rearwardly to a spreader 97 of the construction previously described including the guide surfaces and spreader assemblies as described previously and positioned at relatively low height to obtain the previously described spreading action.

The accumulator provided by the trailer 83 enables the operator to vary the amount of straw spread relative to the amount of straw collected at a specific point on the ground.

Many farms have land which is variable in crop producing ability due to various factors. In the conventional approach where the straw taken from the ground is applied directly back to the ground by the spreading action, those areas which produce more lush crop receive back onto the soil more nutrients from the decomposing straw thus tending to maintain the difference between the crop producing areas. It is proposed therefore that the accumulator should be used to reduce the amount of straw spread over the ground at the areas of improved crop production and to maintain that straw in the accumulator for spreading over the areas of lower crop production for purposes of increased moisture retention and increased nutrient return.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A combine harvester including a straw spreader, the combine harvester comprising a housing, a straw discharge opening at a rear end of the housing, a straw chopper and discharge assembly mounted adjacent the opening for projecting chopped straw rearwardly of the housing out of the opening, the straw spreader comprising a frame, at least one ground wheel on the frame for engaging the ground and supporting the frame at a predetermined height relative to the ground independently of changes in height of the discharge opening from the ground, hitch means for coupling the frame to a rear part of the combine for transportation behind the combine, rotatable spreader means mounted on the frame at a vertical height below a vertical height of the discharge opening for discharging straw in a spread pattern outwardly to a least one side of the frame and guide surface means shaped and arranged to engage the straw as it is projected rearwardly of the housing and to redirect the straw downwardly on to the spreader means.

2. The invention according to claim 1 wherein the guide surface means includes a rear surface portion facing forwardly toward the discharge opening and an upper surface positioned at a vertical height to receive projected straw from the discharge opening thereunder and facing downwardly such that the rear surface portion and upper surface confine projected straw to move downwardly to the spreader means.

3. The invention according to claim 1 wherein the spreader means includes a pair of rotatable members each having a plurality of upstanding fins and rotatable about a substantially vertical axis, each of the rotatable members being mounted on a respective side of the frame so as to project outwardly from the frame to a respective side of the combine and wherein the guide surface means includes means for dividing the straw into two portions such that each portion is directed to a respective one of the rotatable members.

4. The invention according to claim 3 wherein the guide surface means comprises a pair of guide surface portions including said dividing means having a vertically extending apex means arranged substantially centrally of the frame so as to be positioned substantially centrally of and at the same vertical height as the discharge opening, the guide surface portions each curving smoothly outwardly and rearwardly from the apex means so as to separate the straw material as it is discharged from the combine for deposit onto the respective rotatable member.

5. The invention according to claim 4 wherein each of the guide surface portions includes a rear surface portion facing forwardly toward the discharge opening and an upper surface positioned at a vertical height to receive projected straw from the discharge opening thereunder and facing downwardly such that the rear surface portion and the upper surface confine projected straw to move downwardly toward a respective one of the rotatable members.

6. The invention according to claim 3 wherein the fins extend substantially radially from the axis and wherein the fins include a portion at a central area thereof which is of reduced height relative to a portion adjacent the outer periphery thereof.

7. The invention according to claim 6 wherein the guide surface means is arranged to deposit the straw adjacent the axis of rotation of the fins.

8. The invention according to claim 3 wherein the rotatable members rotate in opposite directions such that one rotates in a clockwise direction and the other in a counterclockwise direction and such that the periphery of each moves from an innermost position thereof forwardly and outwardly.

9. The invention according to claim 1 including a guide plate mounted upon housing of the combine harvester underneath the discharge opening thereof for directing the material rearwardly therefrom.

10. The invention according to claim 1 wherein the spreader means is shaped to provide a spreading action on the straw without any chopping action so that the chopping of the straw is carried out by the combine.

11. The invention according to claim 1 wherein the hitch means comprises a pair of arms each arranged on a respective side of the frame and projecting forwardly therefrom to a position alongside a side of the housing for connection to the housing at a position forwardly of the discharge opening thereof.

12. The invention according to claim 11 wherein the spreader means and the guide surface means are mounted upon the frame beneath the arms.

13. The invention according to claim 11 wherein the combine harvester includes a chaffer for separating of chaff from grain and wherein the straw spreader includes a chaff spreader for receiving chaff material from the chaffer, the chaff spreader being supported from said arms at a position beneath said arms and between said arms.

14. A method of spreading straw from a combine harvester comprising collecting from a portion of ground a crop including straw therein, chopping and discharging the straw rearwardly from a rear discharge opening of the combine harvester, collecting the straw as it is discharged from the discharge opening on storage means carried behind the combine harvester on a frame having at least one ground wheel for support of the frame relative to the ground and trailed behind the combine harvester, accumulating a volume of the collected straw on the storage means, discharging the collected straw from the storage means in a spread pattern across the ground behind the storage means, and varying the amount of straw discharged from the storage means relative to the amount of straw collected from the discharge opening of the combine harvester so as to vary the amount of straw spread on the portion of the ground relative to the amount of straw collected from the portion of the ground.

15. The invention according to claim 14 wherein the frame means comprises a trailer vehicle having a hopper thereon and conveyor means at a bottom of the hopper for transporting the accumulated straw rearwardly, and wherein the straw is discharged in the spread pattern by spreader means mounted on a rear portion of the trailer vehicle.

16. The invention according to claim 15 wherein the spreader means includes a pair of rotatable members each having a plurality of upstanding fins and rotatable about a substantially vertical axis, each of the rotatable members being mounted on a respective side of the frame means so as to project outwardly from the frame to a respective side of the combine harvester.

17. The invention according to claim 15 wherein the spreader means is shaped to provide a spreading action on the straw without any chopping action so that the chopping of the straw is carried out by the combine.

* * * * *